United States Patent [19]

Scanlon et al.

[11] 4,387,244

[45] Jun. 7, 1983

[54] CHELATING AGENTS FOR NON-AQUEOUS SYSTEMS

[75] Inventors: Patricia M. Scanlon, Arlington, Mass.; E. Richard Young, Nashua, N.H.

[73] Assignee: W. R. Grace & Co., New York, N.Y.

[21] Appl. No.: 367,973

[22] Filed: Oct. 23, 1981

Related U.S. Application Data

[63] Continuation-in-part of Ser. No. 193,292, Oct. 2, 1980, abandoned.

[51] Int. Cl.³ .......................................... C07C 101/30
[52] U.S. Cl. ..................................... 562/448; 562/426
[58] Field of Search .............................. 562/448, 426

[56] References Cited

U.S. PATENT DOCUMENTS

| | | | |
|---|---|---|---|
| Re. 23,904 | 12/1954 | Bersworth | 562/426 |
| 2,624,754 | 1/1953 | Bersworth | 562/426 |
| 2,717,263 | 9/1955 | McKinney et al. | 562/426 |
| 2,794,818 | 6/1957 | Bersworth | 562/426 |
| 2,967,196 | 1/1961 | Kroll et al. | 562/426 |
| 3,038,793 | 6/1962 | Kroll et al. | 71/1 |
| 3,110,679 | 11/1963 | Rubin | 252/152 |
| 3,293,176 | 12/1966 | White | 562/426 |
| 3,394,174 | 7/1969 | Feigin | 562/426 |
| 3,463,799 | 8/1969 | Szava et al. | 562/426 |
| 3,632,637 | 1/1972 | Martell | 562/448 |
| 3,742,002 | 6/1973 | Ohlson et al. | 562/426 |
| 3,758,540 | 9/1973 | Martell | 562/448 |
| 4,116,991 | 9/1978 | Leneuf | 562/426 |
| 4,130,582 | 12/1978 | Petree et al. | 562/448 |
| 4,197,091 | 4/1980 | Gainer | 562/426 |
| 4,225,502 | 9/1980 | Gaudette et al. | 562/448 |

FOREIGN PATENT DOCUMENTS 2353642  5/1975  Fed. Rep. of Germany ...... 562/143

OTHER PUBLICATIONS

Morris et al., "Organic Chem.", 2nd Eden., p. 52, (1966).
Pasto, "Organic Structure Determination", pp. 321–322 (1965).
Walker, "Formaldehyde", 3rd Eden., p. 308, Reinhold Publ. Corp.

*Primary Examiner*—James H. Reamer
*Attorney, Agent, or Firm*—Ronald A. Bleeker

[57] ABSTRACT

Alkyl-substituted hydroxy benzyl amino acid oligomers are effective metal chelating agents in a broad range of non-aqueous systems. The products claimed display surprisingly high solubilities in a broad range of substituted and unsubstituted aliphatic and aromatic solvents.

20 Claims, No Drawings

CHELATING AGENTS FOR NON-AQUEOUS SYSTEMS

This is a continuation-in-part of Ser. No. 193,292 filed Oct. 2, 1980, now abandoned.

BACKGROUND OF THE INVENTION

This invention is in the field of metal chelating agents. Metal chelating agents are well known to be useful for supplying trace elements to plants suffering from metal deficiencies, for inclusion in metal plating baths, for removing "rust" stains from various types of surfaces, for removing impurities from liquid systems, and for analytical chemical titrations. However, many of the known chelating agents are useful only in aqueous systems. See, e.g., Kroll U.S. Pat. No. 2,967,196; Rubin U.S. Pat. No. 3,110,679. It is the purpose of this invention to provide a new class of metal chelating agents which is soluble in a wide range of non-aqueous systems. Such chelating agents are useful for the extraction or deactivation of metals in non-aqueous systems, for the introduction of metals into non-aqueous systems, for providing oil-borne micronutrients to plants, and for many other applications.

SUMMARY OF THE INVENTION

It is an object of this invention to provide a new class of metal chelating agents which are soluble in a wide range of non-aqueous systems.

The compounds claimed correspond to the general formula

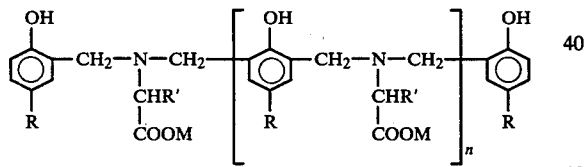

wherein R is an alkyl group having from 1 to 15 carbon atoms; R' is selected from the group H—, a lower alkyl group, HO—CH$_2$—, CH$_3$CH(OH)—, HSCH$_2$—, CH$_3$—SCH$_2$CH$_2$—, H$_2$NCOCH$_2$, H$_2$NCOCH$_2$CH$_2$—, HOOCCH$_2$—, HOOCCH$_2$CH$_2$—, or

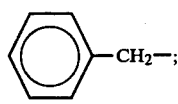

M is selected from the group H+, an alkali metal ion, NH$_4$+, or an aminium ion; and n is an integer from 1 to 6.

The compounds of the invention are prepared by a two-step reaction in which an aqueous solution of formaldehyde is first added to an aqueous solution of an amino acid having the general formula NH$_2$CHR'COOM, and a methanol solution of a phenol having the formula

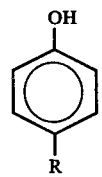

is then added to the resulting mixture.

Various other objects and advantages of this invention will become apparent from the following detailed description thereof.

DETAILED DESCRIPTION OF THE INVENTION

The invention is directed to compounds useful as metal chelating agents is a wide range of non-aqueous systems. The compounds are of the general formula:

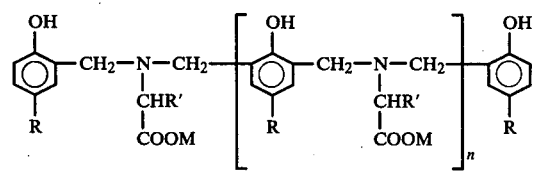

wherein
R is an alkyl group having from 1 to 15 carbon atoms;
R' is selected from the group H—, a lower alkyl group, HO—CH$_2$—, CH$_3$CH(OH)—, HSCH$_2$—,CH$_3$—SCH$_2$CH$_2$—, H$_2$NCOCH$_2$—, H$_2$NCOCH$_2$CH$_2$—, HOOCCH$_2$—, HOOCCH$_2$CH$_2$—, or

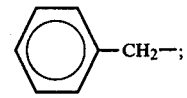

M is selected from the group consisting of H+, an alkali metal ion, NH$_4$+, or an aminium ion; and
n is an integer from 1 to 6.

The claimed compounds are prepared in a two-step reaction. In the first step, formaldehyde is reacted with an amino acid of the general formula NH$_2$CHR'COOM in an aqueous solution whose pH is maintained at 7.5–8.0 with sodium or potassium hydroxide. A cosolvent such as methanol is then added. In the second step, while still maintaining the pH at 7.5–8.0, a methanol solution of a phenol of the general formula

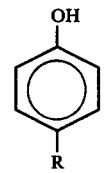

is slowly added to the reaction mixture, which is then heated at reflux. On cooling and standing, the desired product can be separated out as an oily layer while the water/methanol layer is decanted. The product is then dried and ground to a powder. Vacuum drying has been used for laboratory scale preparations, but other types of drying could obviously be employed for commercial purposes.

It has been found that when lower alkyl substituents are used (R=1-3 carbons), compounds are obtained with a commercially significant solubility in methanol. However, as one moves to higher alkyl substituents, the compounds of the present invention are found to display high solubilities in a much wider array of non-aqueous systems while the aqueous solubility of such compounds becomes negligible.

R' is the residue resulting from the α-amino acid. For example, if the amino acid used is glycine, R'=H; if alanine, R'=CH3—, etc. The invention is not limited to cases where R' is a lower alkyl residue, but also includes residues consisting of hydroxyalkyl, thioalkyl, phenylalkyl, and other groups. By way of illustration, the following list contains various values of R' which are deemed to be within the scope of the present invention, as well as the name of the amino acid from which that residue is obtained:

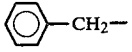

| R' = H— | glycine |
| CH3— | alanine |
| CH3CH2— | α-amino butyric acid |
| CH3CH2CH2— | iso-leucine acid |
| (CH3)2—CH— | valine |
| (CH3)2—CHCH2— | leucine |
| CH3CH2CH(CH3)— | 2-amino-3-methyl-petanoic acid |
| HO—CH2— | serine |
| CH3CH(OH)— | threonine |
| HSCH2— | cysteine |
| CH3—S—CH2CH2— | methionine |
| H2NCOCH2— | asparagine |
| H2NCOCH2CH2— | glutamine |
| HOOCCH2— | aspartic acid |
| HOOCCH2CH2— | glutamic acid |
| ⟨O⟩—CH2— | phenylalanine. |

The formaldehyde may be supplied in any of its commercially available forms, such as formalin, paraformaldehyde, formcels, and trioxane.

In a preferred embodiment of this invention, R is a nonyl group, R' is H, M is Na+, and n=1.

The following Examples illustrate, without limitation, various additional embodiments of the invention.

EXAMPLE 1

R=nonyl, n=6, M=Na

In a 400 ml beaker, a mixture of glycine, 52.5 g/0.7 mole; water, 64 mls; and 50% NaOH, 28 g/0.35 mole was prepared and adjusted to pH=8 with hydrochloric acid. To this was added 134 g (1.47 mole) of 30% formaldehyde solution over a 30 minute period, causing the temperature to rise to 36° C. During the addition, the pH was held at 7.5-8.0 by concurrent addition of 28 g of 50% NaOH. This first solution was then added to 300 ml of methanol in a 2 liter three neck flask; and the pH, which fell to 6.2, was readjusted to 7.5. To this was then added a solution of p-nonylphenol, 176 g/0.8 mole, in 150 ml of methanol over a 45 minute period. During the addition, the mixture was heated to 66° C. and then to reflux. The mixture remained turbid throughout the addition in spite of additional solvent. Refluxing was continued for 5 hours after the addition ended. Upon cooling, two liquid layers were obtained. The upper, solvent, layer was decanted off, and the lower, product, layer was dried in a vacuum desiccator and ground to a fine powder. The product weighed 233 g or 89.3% of theory. A toluene solution of this product was shaken with aqueous solutions of iron, copper, cobalt, and nickel salts. In each case metal chelation was indicated by strong coloration of the toluene layer.

EXAMPLE 2

R=nonyl, n=6, M=Na

A solution of 52.5 g glycine, 64 ml water, and 28.2 g of 50% NaOH was prepared and adjusted to pH=8 with dilute HCl. To this was added 134 g of 30% formaldehyde over a 40 minute period, then 28.3 g of 50% NaOh was added dropwise. This solution was mixed with 600 ml of methanol, and the pH was readjusted to 7.5. Over a 2 hour period, a solution of 177.8 g of nonyl phenol in 200 ml of methanol was added. Thirty minutes into the addition, heating was begun, raising the temperature to 56° C. by the end of the addition. The mixture was refluxed at 72°-73° for about 3½ hours after the addition, then allowed to cool and settle. The upper layer was decanted, and the lower layer was dried. Obtained 197.5 g of dried powder for a 75.7% yield.

EXAMPLE 3

R=nonyl, n=1, M=K

The general procedure of Example 2 was repeated except that potassium hydroxide was used in place of sodium hydroxide and the charges used were as follows:

| p-nonyl phenol | 65.4 gms. | (0.3 mole) |
| glycine | 15 | (0.2 mole) |
| KOH | 11.2 | (0.45 mole) |

The product recovered was 84.6 gms. of a yellow solid.

EXAMPLE 4

R=nonyl, n=4, M=Na

The general procedure of Example 2 was repeated except that the reactant charges were changed to give a 6:5 phenol to glycine ratio. The dried product weighed 136.6 g, or 70.8% of theory.

EXAMPLE 5

R=nonyl, n=2, M=Na

The general procedure of Example 2 was repeated except that the reactant charges were changed to give a 4:3 phenol to glycine ratio. The dried product weighed 30.4 g or 24.4% theory.

EXAMPLE 6

R=t-butyl, n=6, M=Na

The general procedure of Example 2 was repeated except that 0.8 mole of p-tert-butylphenol was substituted for the nonylphenol. The dried product weighed 145.5 g, or 71% of theory.

EXAMPLE 7

R=dodecyl, n=6, M=Na

The general procedure of Example 2 was repeated using p-dodecyl phenol. The dried product weighed 255.8 g, or 86.8% of theory.

EXAMPLE 8

R=t-amyl, n=6, M=Na

The general procedure of Example 2 was repeated using p-tertamylphenol. The dried product weighed 129.7 g, or 59.4% of theory.

EXAMPLE 9

R=nonyl, R'=CH$_3$—, n=6, M=Na

The general procedure of Example 2 was repeated except that alanine was used in place of glycine. An equimolar solution of 15.6 gms. of alanine and 7 gms. of 50% NaOh was prepared. To this was added 11.1 gms of formaldehyde. Finally, a methanol solution of 43.6 gms. of para-nonyl phenol was added. 37 gms. of a solid yellow product were recovered.

EXAMPLE 10

R=nonyl, R'=(CH$_3$)$_2$—CH—, n=6, M=Na

The general procedure of Example 2 was repeated except that valine was used in place of glycine. An equimolar solution of 20.5 gms. of valine and 7 gms. of 50% NaOH was prepared. To this was added 11.1 gms. of formaldehyde. Finally, a methanol solution of 43.6 gms. of para-nonyl phenol was added. 33.6 gms. of a solid yellow product were recovered.

EXAMPLE 11

R=nonyl, R'=CH$_3$S—CH$_2$—CH$_2$—, n=6, M=Na

The general procedure of Example 2 was repeated except that methionine was used in place of glycine. An equimolar solution of 26.1 gms. of methionine and 7 gms. of 50% NaOh was prepared. To this was added 11.1 gms. of formaldehyde. Finally, a methanol solution of 43.6 gms. of para-nonyl phenol was added. 44.9 gms. of a solid yellow product were recovered.

EXAMPLE 12

R=nonyl, n=1, M=Na

The general procedure of Example 2 was used except that the following charges were used in order to give a product in which n=1:

| p-nonyl phenol | 65.4 gms. | (0.3 mole) |
| --- | --- | --- |
| glycine | 15 | (0.2 mole) |
| NaOH | 8 | (0.2 mole) |
| HCHO | 13.5 | (0.45 mole) |

The product recovered was 81.4 gms. of an off-white solid.

The following structure was assigned to the product recovered on the basis of method of synthesis, elemental analysis, and copper chelating value:

$$\underset{\substack{C_9H_{19}}}{\underset{OH}{\bigcirc}}-CH_2-\underset{\substack{CH_2 \\ | \\ C=O \\ | \\ O-Na}}{N}-\underset{\substack{C_9H_{19}}}{\underset{OH}{\bigcirc}}-CH_2-\underset{\substack{CH_2 \\ | \\ C=O \\ | \\ O-Na}}{N}-\underset{\substack{C_9H_{19}}}{\underset{OH}{\bigcirc}}$$

After extraction with acetonitrile to give a purified product for analysis, data from elemental analysis (see D. Pasto & C. Johnson's "Organic Structure Determination," Prentice-Hall 1969 p.321) confirmed a formula of C$_{53}$H$_{80}$N$_2$O$_7$Na$_2$, consistent with the foregoing structure. The following data were obtained:

|  | N | C | H |
| --- | --- | --- | --- |
| Theory (%) | 3.1 | 70.5 | 8.9 |
| Found (%) | 2.9 | 69.64 | 9.6 |

In addition, the chelation value of the purified product (as found by the methods hereinafter specified) for copper (1:1) was 70.6 mgs/gr., the exact value that would be expected for this structure in theory.

EXAMPLE 13

R=methyl, n=1, M=Na

The general procedure of Example 2 was repeated using paracresol. The product was isolated by removal of solvents on the Rotovap followed by precipitation with acetonitrile and vacuum drying. The following charges were used:

| p-cresol | 97.2 gms. | 0.9 mole |
| --- | --- | --- |
| glycine | 45 | 0.6 |
| NaOH | 24 | 0.6 |
| HCHO | 40.5 | 1.35 |

130 gms. of a yellow solid product were recovered.

EXAMPLE 14

R=isopropyl, n=1, M=Na

The general procedure of Example 2 was repeated using para-isopropyl phenol. The following charges were used:

| p-isopropyl phenol | 61.3 gms. | 0.45 mole |
| --- | --- | --- |
| glycine | 22.5 | 0.3 |
| NaOH | 12 | 0.3 |
| HCHO | 20 | 0.65 |

77 gms. of a yellow solid product were recovered.

EXAMPLE 15

R=nonyl, R'=HOOCCH$_2$—, n=6, M=Na

The general procedure of Example 2 was repeated using aspartic acid in place of glycine. The following charges were used:

| p-nonyl phenol | 179 gms. | 0.8 moles |
| --- | --- | --- |
| aspartic acid | 93.1 | 0.7 |
| HCHO | 42 | 1.4 |
| NaOH | 28 | 0.7 |

152 grams of a fine yellow solid product were obtained.

The products of the foregoing examples were evaluated for their chelating ability. In a test for copper chelating ability, a 0.350–0.400 gram sample of the chelating agent is weighed accurately into a 4 oz. bottle, 25 ml of reagent toluene is added, and the bottle is shaken until a solution is obtained. To this is then added by pipet exactly 25 ml of 0.04 M CuCl$_2$ aqueous solution. The bottle is then mechanically shaken for one hour, after which the two layers are given time to separate completely. A 5 ml portion of the lower, aqueous, layer is withdrawn by pipet and the residual Cu is determined by titration with 0.01 M EDTA to a PAN endpoint as described in *EDTA Titrations*, H. A. Flaschka, Pergamon Press, New York (1959), pg. 81. In a test for iron chelating ability the extraction procedure above is followed except that 0.05 M FeCl₃ is used and 0.5 g of crystalline NaCl may be added to aid in layer separation. A 10 ml portion of the lower, aqueous, layer is withdrawn by pipet and the residual Fe is determined by titration with 0.05 M EDTA to a Chromazurol S endpoint as described in *Complexometric Titrations*, G. Schwarzenback (H. Irving, Trans.), Interscience Publishers, New York (1957), pg. 77. The results are summarized below:

employed: The sample was first weighed into a vial and enough solvent was added to give the desired weight percent. The vial was then capped and left at room temperature overnight. Finally, the vial was checked for the presence or absence of solid. The results are summarized below (values are in weight percent):

|  | Ex 2 | Ex 3 | Ex 4 | Ex 5 | Ex 6 | Ex 7 | Ex 8 | Ex 9 | Ex 10 | Ex 11 | Ex 12 | Ex 13 | Ex 14 | Ex 15 |
|---|---|---|---|---|---|---|---|---|---|---|---|---|---|---|
| Water | 0 | <1 | gel | 0 | gel | 0 | gel | <1 | <1 | <1 | <1 | 25 | <1 | <1 |
| Methanol | 5 | 10 | 5 | 5 | 5 | 10 | 20 | 15 | 30 | 30 | 5 | 10 | 5 | 1 |
| Ethanol | 1 | 5 | 5 | 1 | 1 | 1 | 5 | 5 | 10 | 10 | 1 | <1 | <1 | <1 |
| i-PrOH | <1 | 1 | <1 | 1 | <1 | 0 | 0 | 5 | 10 | 10 | 1 | <1 | <1 | <1 |
| Butanol | 1 | 5 | 20 | 50 | <1 | 5 | 1 | 5 | 10 | 10 | 5 | <1 | <1 | <1 |
| 2-Ethyl-hexanol | <1 | 1 | 5 | 5 | <1 | 5 | <1 | 5 | 10 | 10 | 1 | <1 | <1 | <1 |
| Acetone | 0 | <1 | 0 | 0 | 0 | 0 | 0 | <10 | <10 | <10 | <1 | <1 | <1 | <1 |
| 4-Methyl-2-pentanone | 1 | 5 | 50 | 5 | <1 | 20 | 0 | 5 | 10 | 10 | 5 | <1 | <1 | <1 |
| Toulene | 60 | 10 | 60 | 50 | 50 | 50 | 5 | 15 | 30 | 30 | 50 | <1 | <1 | <1 |
| Ethyl-benzene | 50 | 10 | 50 | 50 | 20 | 50 | 5 | 5 | 10 | 10 | 50 | <1 | <1 | <1 |
| Ethyl Acetate | 20 | 5 | 30 | 50 | 0 | 20 | 0 | <10 | <10 | <10 | 10 | <1 | <1 | <1 |
| Acetonitrile | 0 | <1 | 0 | 0 | 0 | <1 | 0 | 0 | 0 | 0 | <1 | <1 | <1 | <1 |
| Tetrahydrofuran | 20 | 1 | 35 | 20 | 1 | 50 | 20 | <10gel | 10 | <10 | 20 | <1 | <1 | <1 |
| Hexanes | 1 | 10 | 50 | 50 | 0 | 20 | 0 | <10gel | 30 | 30gel | 5 | <1 | <1 | <1 |
| Cyclohexane | 40 | 5 | 5 | 40 | 0 | 50 | 0 | 5 | 30 | 30 | 40 | <1 | <1 | 20 |
| Octane | 40 | 1 | 25 | 40 | 0 | 50 | 0 | <10 | 10 | 10 | 40 | <1 | <1 | <1 |
| Iso-octane | 10 | 1 | 50 | 50 | 0 | 20 | 0 | <10 | 10 | 10 | 10 | <1 | <1 | <1 |
| Decane | 40 | 1 | 5 | 40 | 0 | 50 | 0 | 10 | 20 | 30 | 40 | <1 | <1 | <1 |
| CH₂Cl | 55 | 10 | 50 | 25 | 50 | 50 | 50 | <10 | 10 | 10 | 50 | <1 | <1 | 1 |
| Chloroform | 55 | 10 | 50 | 25 | 1 | 50 | 20 | 10 | 10 | 10 | 50 | <1 | <1 | 30 |

| Product | Copper CV (mg/g) | Iron CV (mg/g) |
|---|---|---|
| Ex. 2 | 83.00 | 50.12 |
| Ex. 3 | 72.50 | 36.30 |
| Ex. 4 | 77.16 | 72.41 |
| Ex. 5 | 69.61 | 69.28 |
| Ex. 6 | 92.68 | ppt |
| Ex. 7 | 70.42 | 38.60 |
| Ex. 8 | 99.56 | 90.69 |
| Ex. 9 | 74.93 | not obtained |
| Ex. 10 | 63.09 | 17.29 |
| Ex. 11 | 62.68 | 10.95 |
| Ex. 12 | 79.80 | 29.40 |
| Ex. 13 | not obtained; water layers too highly colored | not obtained; water layers too highly colored |
| Ex. 14 | not obtained; water layers too highly colored | not obtained; water layers too highly colored |
| Ex. 15 | 105.00 | not obtained; no layer separation |

These high results demonstrate that the compounds of the present invention are highly effective chelating agents. Moreover, although the chelated metals used in this demonstration were Cu (II) and Fe (III), it should be obvious to those skilled in the art that the compounds of the present invention could also be used with other commonly chelated metals.

The products of the present invention display surprisingly high solubilities in a broad range of substituted and unsubstituted aliphatic and aromatic solvents. For purposes of illustration, and without limitation, the products of the foregoing examples were evaluated for approximate solubility in a number of common solvents. In determining solubility, the following procedure was These results demonstrate that the compounds of the present invention are readily soluble in a wide variety of non-aqueous solvents.

We claim:

1. A compound having the formula

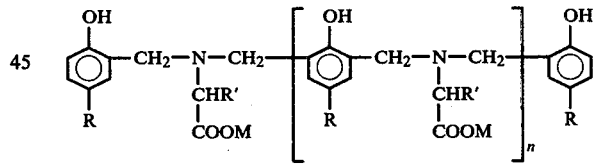

wherein
R is an alkyl group having from 1 to 15 carbon atoms;
R' is selected from the group H—, a lower alkyl group, HO—CH₂—, CH₃CH(OH)—, HSCH₂—, CH₃—SCH₂CH₂—, H₂NCOCH₂—, H₂NCOCH₂CH₂—, HOOCCH₂—, HOOCCH₂CH₂—, and

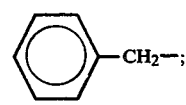

M is selected from the group consisting of H+, an alkali metal ion, NH₄+, and an aminium ion; and
n is an integer from 1 to 6.

2. A compound according to claim 1 in which R is an alkyl group having from 4 to 15 carbon atoms.

3. A compound according to claim 1 in which R is selected from the group t-butyl, t-amyl, nonyl, and dodecyl.

4. A compound according to claim 1 in which R' is selected from the group H—, CH₃—, (CH₃)₂CH—, CH₃S—CH₂CH₂—, and HOOCCH₂—.

5. A compound according to claim 1 in which R is a nonyl group.

6. A compound according to claim 1 in which R' is H.

7. A compound according to claim 1 in which M is Na+.

8. A compound according to claim 1 in which n is 1.

9. A compound according to claim 1 in which R is a nonyl R' is H, M is Na+, and n is 1.

10. A methanol solution of a compound according to claim 1 wherein R is an alkyl group having from 1 to 3 carbon atoms.

11. A process for preparing a compound having the formula:

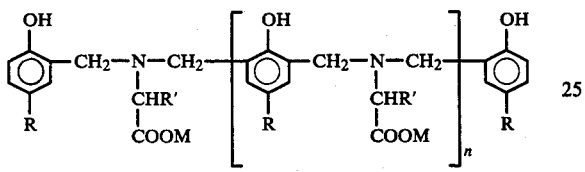

wherein
R is an alkyl group having from 1 to 15 carbon atoms;
R' is selected from the group H—, a lower alkyl group, HO—CH₂—, CH₃CH(OH)—, HSCH₂—, CH₃—SCH₂CH₂—, H₂NCOCH₂—, H₂NCOCH₂CH₂—, HOOCCH₂—, HOOCCH₂CH₂—, and

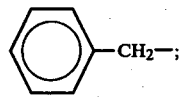

M is selected from the group consisting of H+, an alkali metal ion, NH₄+, and an aminium ion; and
n is an integer from 1 to 6;
said process comprising
(i) forming a first mixture by adding about 2 molar equivalents of an aqueous solution of formaldehyde to about 1 molar equivalent of an aqueous solution of an amino acid having the general formula NH₂CHR'COOM over a time period of 0.5-2 hours and at a temperature of 20°-50° C. while maintaining the mixture at a pH of 7.5-8;

(ii) forming a second mixture by admixing the first mixture with a sufficient amount of methanol to permit dissolution of a phenol of the general formula

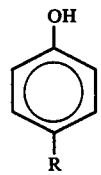

while maintaining the pH of the second mixture at 7.5-8.0

(iii) forming a third mixture by adding to the second mixture 1.1 to 1.5 molar equivalents of a methanol solution of a phenol of the general formula

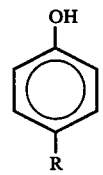

over a period of 0.5-2 hours at a temperature of 30°-80° C. while maintaining the pH at 7.5-8.0;

(iv) heating the third mixture at reflux for a period of 5-7 hours; and (v) allowing the third mixture to cool, followed by separation and recovery of said compound.

12. The process according to claim 11 in which R is an alkyl group having from 4 to 15 carbon atoms.

13. The process according to claim 11 in which R is selected from the group t-butyl, t-amyl, nonyl, and dodecyl.

14. The process according to claim 11 in which R' is selected from the group H—, CH₃—, (CH₃)₂CH—, CH₃S—CH₂CH₂—, and HOOCCH₂—.

15. The process according to claim 11 wherein R is a nonyl group.

16. The process according to claim 11 in which R' is H.

17. The process according to claim 11 in which M is Na+.

18. The process according to claim 11 in which n is 1.

19. The process according to claim 11 in which R is a nonyl group, R' is H, M is Na+, and n is 1.

20. The process according to claim 11 in which R is an alkyl group having from 1 to 3 carbon atoms and in which the desired product is soluble in methanol.

* * * * *